(12) United States Patent
Pierse

(10) Patent No.: US 6,298,278 B1
(45) Date of Patent: Oct. 2, 2001

(54) SYSTEM FOR MONITORING WORKPIECE AND TOOL CARRIAGES MOVEMENT USING A TWO-AXIS SCALE ATTACHED TO A CARRIAGE COOPERATING WITH A READING HEAD ATTACHED TO THE OTHER CARRIAGE

(75) Inventor: Michael George Pierse, Bedford (GB)

(73) Assignee: Unova U.K. Limited, Aylesbury (GB)

(*) Notice: Subject to any disclaimer, the term of this patent is extended or adjusted under 35 U.S.C. 154(b) by 0 days.

(21) Appl. No.: 09/111,159

(22) Filed: Jul. 7, 1998

Related U.S. Application Data

(63) Continuation-in-part of application No. PCT/GB97/00450, filed on Feb. 18, 1997.

(30) Foreign Application Priority Data

Feb. 19, 1996 (GB) .................................................. 9603426

(51) Int. Cl.⁷ ........................... G06F 19/00; B24B 49/00; B24B 51/00
(52) U.S. Cl. .............................. 700/174; 451/8; 700/178; 700/159; 700/192
(58) Field of Search ............................. 700/13, 108, 180, 700/186, 188, 159, 196, 174; 451/8, 9

(56) References Cited

U.S. PATENT DOCUMENTS

| | | | |
|---|---|---|---|
| 3,090,896 | * | 5/1963 | Bowden et al. ...................... 318/19 |
| 4,225,928 | * | 9/1980 | Ohkubo ........................... 364/474.14 |
| 4,401,930 | * | 8/1983 | Kato et al. .......................... 318/603 |
| 4,817,007 | * | 3/1989 | New ................................ 364/474.01 |
| 5,264,915 | | 11/1993 | Huber ................................... 356/356 |
| 5,730,643 | * | 3/1998 | Bartlett et al. ........................... 451/8 |

FOREIGN PATENT DOCUMENTS

| | | | | |
|---|---|---|---|---|
| 2170005A | * | 7/1986 | (GB) | ............................... G01B/9/02 |
| 2255636A | * | 11/1992 | (GB) | ............................. B24B/49/12 |

* cited by examiner

*Primary Examiner*—Thomas Lee
*Assistant Examiner*—Chun Cao
(74) *Attorney, Agent, or Firm*—Lee, Mann, Smith, McWilliams, Sweeney & Ohlson

(57) ABSTRACT

A machine tool has a carriage, has a workpiece carriage for carrying a workpiece from which material is removed by a tool carried by a tool carriage. A two-axis scale is attached to one of the carriages, and cooperates with a reading head attached to the other carriage. The output from the reading head is processed by signaling processing means to provide an indication of the position and/or movement of the carriages relative to each other and for generating positional data about one or both of the carriages to assist in controlling their movement in order to perform a machine operation. By directly measuring the relative positions of the two carriages, problems arising from, for example, distortions of the machine frame on which the carriages are mounted are at least mitigated. A preferred embodiment of the machine incorporates a second reading head attached to one carriage and incorporating the scale on another carriage so that the outputs from the two reading heads can be used to determine whether there has been any relative angular displacement of the paths followed by the carriages. There is also provided a method of determining the linear movement of one of the carriages relative to the other, and the machining process achieved using the machine tool.

24 Claims, 6 Drawing Sheets

SYSTEM FOR MONITORING WORKPIECE AND TOOL CARRIAGES MOVEMENT USING A TWO-AXIS SCALE ATTACHED TO A CARRIAGE COOPERATING WITH A READING HEAD ATTACHED TO THE OTHER CARRIAGE

This application is a Continuation-in-part (CIP) of prior application No. PCT/GB97/00450 filed Feb. 18, 1997.

FIELD OF INVENTION

This invention concerns methods and apparatus for monitoring the movement of workpiece and tool carriage movement in machine tools, and machine tools, when fitted with such improved monitoring systems. By machine tool is meant any machine in which a tool is used to remove material from a workpiece and wherein either the tool and workpiece are moved relative to one another during the machining operation typically involving rotation and also linear displacement of one or both.

BACKGROUND TO THE INVENTION

Currently the means of obtaining carriage positional feedback in a two-axis machine such as a lathe, has involved fitting a linear position sensing device between each moving axis and the base of the machine. Thus the relationship of position between a tool and a workpiece is derived from two sets of feedback information, namely 1. a point on the workpiece carriage which is monitored for change of position with respect to the base, and
2. a point on the tool carriage which is monitored for change in position with respect to the base.

However the position on the base which is checked against the point on the tool carriage is not the same as the point on the base which is used as the reference for monitoring the position of the point on the workpiece carriage. As a consequence errors can arise in the computation of the position of the tool relative to the workpiece at the point of engagement due to the following possibilities:

A) variation in relationship between the machining point and the reference point of the work-feed measuring system, B) similar variations in the relationship between the machining point and the tool feed measuring system, and C) any static or dynamic changes in the relationship between the two points on the base to which the two axis measuring systems are attached.

It is an object of the present invention to provide an improved method of measuring the position of workpiece carriage and tool carriage so as to reduce the error in the computation of the tool/workpiece point of engagement and to provide a machine capable of high precision machining.

It is also an object of the invention to provide a design of machine which does not require the same degree of build accuracy as is necessary using conventional carriage monitoring systems and should therefore be considerably cheaper to build.

Although the invention may be applied to machine tools in which the workpiece carriage and/or the tool carriage move through considerable distances during workpiece machining, the invention is in fact of primary application to machine tools having a small working volume, in which both the workpiece carriage and the tool carriage only move through relatively small distances during the machining operation.

SUMMARY OF THE INVENTION

A method of determining the linear movement of a first carriage relative to a second carriage in a machine tool, wherein the two carriages respectively carry a workpiece and a tool for machining the workpiece, and wherein two-axis scale means is attached to one carriage so as to move therewith, and a reading head which cooperates with the scale means is attached to the other carriage to move therewith, wherein the method comprises the steps of: deriving positional data from the reading head and scale means for the one carriage, exerting a force on one or the other or both of the two carriages to effect a movement thereof relative to the machine, deriving a value for the linear displacement of the one carriage relative to the other by determining the difference between the positional data at the beginning and that at the end of the carriage movement.

The invention also provides a further method as aforesaid if a second reading head is attached to the said other of the two carriages at a position thereon separate from the position of attachment of the first reading head measured parallel to the axis of movement of the said other carriage, the further method comprising the steps of deriving second positional data relating to the said one carriage from the second reading head, and computing an error value from any difference between the displacement values derived from the positional data from the two separate reading heads, and correcting the linear displacement value obtained from the first reading head by using the said computed error value.

The preferred development thus enables any angular deflection or any distortion of one carriage relative to the machine or to the other to be detected and compensated by comparing the position determinable from the data derived from the second reading head with that determinable from the data derived from the first reading head during or at the end of a carriage movement. By moving a carriage in incremental steps and adjusting the position value at the end of each step, so very accurate positioning of a carriage can be achieved.

Differences in the position data can be attributed inter alia to the angular displacement of one carriage relative to the other and/or non-orthogonality of the two carriage axes, and although any such difference may be small in a well designed and constructed machine, cumulative machining errors will arise if the errors are not corrected and the invention provides for this by enabling the positional data obtained from the first reading head to be corrected by using the difference values obtained by using signals from the two reading heads.

The invention also lies in a machine tool wherein a two-axis scale means is mounted on the tool carriage or the workpiece carriage thereof so as to move therewith, and a reading head adapted to cooperate with the scale means is attached to the other said carriage, at a point which is close to the machining point, and signal processing means receives signals from the reading head indicative of the position and/or movement of one carriage relative to the other, for generating positional data about one or both of the carriages to assist in controlling the movement of one or both carriages to effect a machining operation.

A machine tool as aforesaid preferably includes a second reading head, also adapted to cooperate with the scale means, and mounted to the same carriage as the first reading head but at a different position, (measured parallel to the carriage axis) from that at which the first head is mounted, and the signal processing means is receptive of signals from both heads and provides a first output signal indicative of the linear movement of one carriage relative to the other, and a second output signal indicative of any difference between the positional signals derived from the two heads (and therefore indicative of inter alia any non-linear or non-orthogonal movement of one carriage relative to the other).

Where two reading heads are provided, the invention thus also includes the step of adjusting the position of the workpiece or tool carriage, or both, to compensate for any difference in the positional data obtained from the reading heads consequent on any unwanted movement of one carriage relative to the machine and/or the other.

Typically the reading head of the first measuring system is attached to the underside of the tool carriage close to the machining point and a grating therefor is mounted in a similar manner to the workpiece carriage.

The scale means may comprise a single relatively large area two-axis scale, or two smaller two-axis scales arranged in substantially the same plane.

In a preferred embodiment two separate two-axis scales are attached to the one carriage, the two scales being arranged in substantially the same plane and as close as possible to the point of engagement between the tool and the workpiece, and two reading heads for cooperating with the two scales are carried by the other of the two carriages. If the two carriage axes of movement are orthogonal and no distortion occurs between one carriage axis and the other, then the change in X and Z coordinates derived from the two reading heads for any relative movement as between one carriage and the other will be the same. If however, any distortion arises so as to cause the two carriage axes to become non-orthogonal, then after movement of one carriage relative to the other, the X and/or Z coordinates obtained from one of the two reading heads will be different from the values, which the value(s) obtained from the other reading head would, by extrapolation, indicate the first value(s) should be.

The difference can be monitored and compensated for by adjusting the drive to the workpiece carriage, or tool carriage, or both, so as to re-position one or the other or both to the position it or they should have adopted had the movement been undistorted, so as to compensate for any distortion and maintain the point of engagement of the tool and the workpiece independent of distortion between the workpiece and tool carriage axes.

Apparatus embodying the invention and employing two reading heads preferably includes feedback means for adjusting the position of a workpiece or tool carriage in a machine tool to take account of any error signal obtained from signal processing means receptive of positional data from the two reading heads.

The invention provides a system where the following machine induced errors are substantially reduced, if not eliminated, as possible sources of machining errors:

1. orthogonality of the axes of the tool carriage and workpiece carriage,
2. errors contributed by the machine base, including static low frequency dynamic compliance, geometric stability, thermal expansions and distortions (all of which can affect the angle of one of the said axes relative to the other), and
3. lateral axial and angular deviations and disturbances of the guideways.

The positional relationship between the workpiece carriage and the tool carriage is sensed directly instead of via the machine base, which in the conventional arrangement results in the base being included in the position sensing loop. The invention thus enables machine induced errors to be substantially reduced.

The remaining errors in the machining system can now be seen to be attributable as follows:

(A) distortions, deflections, expansions etc, occurring in the machine mechanics situated in the direct path between the cutting tool and grating reference point, and between the workpiece cutting zone and the direct path to the grating reference point.

(B) errors in the grating itself. These errors are not necessarily trivial. Scaling errors, orthogonality of the X and Z fringes, interpolation errors and any other errors in the grating will be directly applied to the workpiece.

Error correction of scaling and orthogonality (listed under (B)) can be carried out electronically using computer control.

By careful machine design, errors arising from distortions and deflections etc, identified in (A) above, can be reduced to a minimum.

Remaining errors under heading (B) tend to be very small and in general can be ignored.

Where during machining, linear movement of the tool and/or workpiece along their respective axes is short, and where the machine axes are in close physical proximity, the dynamic characteristics of a machine incorporating the invention can be enhanced, by applying viscous damping to the carriage movements.

In one embodiment of the invention, incorporating viscous damping, a first plate may be fitted to the tool carriage and a second plate may be fitted to the workpiece carriage, the two plates being in close proximity to the scale system, and viscous damping may be applied to the two plates.

In one arrangement each of the two plates is individually engaged by a separate viscous damping medium, each of which is thus adjustable for fine tuning or the two plates may protrude into a single viscous damping medium.

In another arrangement one of the plates overlies the other and a viscous fluid is introduced between the two plates to provide the said damping.

By eliminating both static and low frequency machine errors so comprehensively, and with known methods applied to control higher frequency relative motions, a machine can be constructed in accordance with the invention so as to possess high machining accuracy yet at a low cost.

According to another aspect of the present invention, a method of machining so as to remove material from a rotating workpiece using a tool which may be static or rotating, comprises moving the tool so as to engage the surface of the workpiece to remove material therefrom, determining the position of the tool carriage using a two-axis scale measuring system comprising a reading head mounted to one of the workpiece carriage or tool carriage and two-axis scale means mounted to the other, positioned close to the working region, and controlling the advance of the tool, and therefore the extent of the machining, using positional data from the reading head.

According to a further aspect of the invention, a method of machining as aforesaid may include the step of determining the tool carriage position by means of a second reading head also cooperating with the said two axis scale means, and mounted to the same carriage as is the first mentioned reading head, and the method includes the steps of measuring any distortion (such as an angular drift of one carriage axis relative to the other) and utilising any measured divergence (error) between scale readings and predicted scale readings following any given linear carriage movement of to enable a correction to be made in the linear carriage movement and thereby compensate for any distortion due to machining forces.

According to a further preferred feature of the invention, the guideways defining the tool carriage and workpiece carriage axes are preferably mounted on orthogonal vertical faces of a machine structure so as to reduce the distance between the two guideways.

According to a further aspect of the invention, a first two-axis scale is mounted in close proximity to the workpiece carriage and a second two-axis scale is also mounted to the workpiece carriage but spaced therefrom (measured perpendicular to the axis of the workpiece carriage), by a distance similar to that between the first mentioned scale and the workpiece, measured along the workpiece axis, and position sensing probes are mounted on the tool carriage for cooperating with the two scales.

Where the tool and workpiece axes are in the same horizontal plane, the two scales are preferably mounted in the same horizontal plane. Where this is not the case, the first scale preferably extends horizontally substantially in alignment with the tool and tool mounting whilst the second mentioned scale extends horizontally substantially in alignment with the workpiece and its support, so that parallax errors as between tool and first scale and between the workpiece and the second scale can be reduced.

Since both two-axis scales are attached to the same carriage, a single large area scale may be used in place of the two smaller ones, but since the invention is primarily applicable to machines in which only relatively small movement is required along the tool and workpiece axes respectively, much of the area of such a large two-axis scale would be unused in practice and the cost of such a component would not therefore normally be justified.

In a machining process in which a tool is progressively moved by means of discrete movement instructions relative to a rotating workpiece so as to remove material from a rotating surface thereof, first tool position defining signals are obtained from a first reading head which is attached to and movable with the tool support and which cooperates with two-axes scale means attached to the workpiece support for movement parallel to the axis of rotation of the workpiece as the workpiece support is moved; and second tool position defining signals are obtained from a second reading head also attached to and movable with the tool support and cooperating with the two-axis scale means; and error signals indicative of any positional error of the tool are obtained by determining the values of the signals which should be obtained from the second reading head for a given linear movement of the tool from the first position to a second position using tool position defining signals obtained from the first reading head, and comparing therewith the actual second tool position defining signals obtained from the second reading head therewith.

The position of one carriage or the other (or both) may be adjusted in response to any error signal revealed by the said comparison, to achieve a desired position of the tool relative to the workpiece, or the next movement instruction so the tool support may be modified to take account of the actual position of the tool as a result of the previous movement instructions.

Without prejudice to the generality of the expression "machine tool", the invention may be applied to lathes and grinding machines.

BRIEF DESCRIPTION OF THE DRAWINGS

The invention will now be described by way of example, with reference to the accompanying drawings, in which.

DETAILED DESCRIPTION

Figure 1:
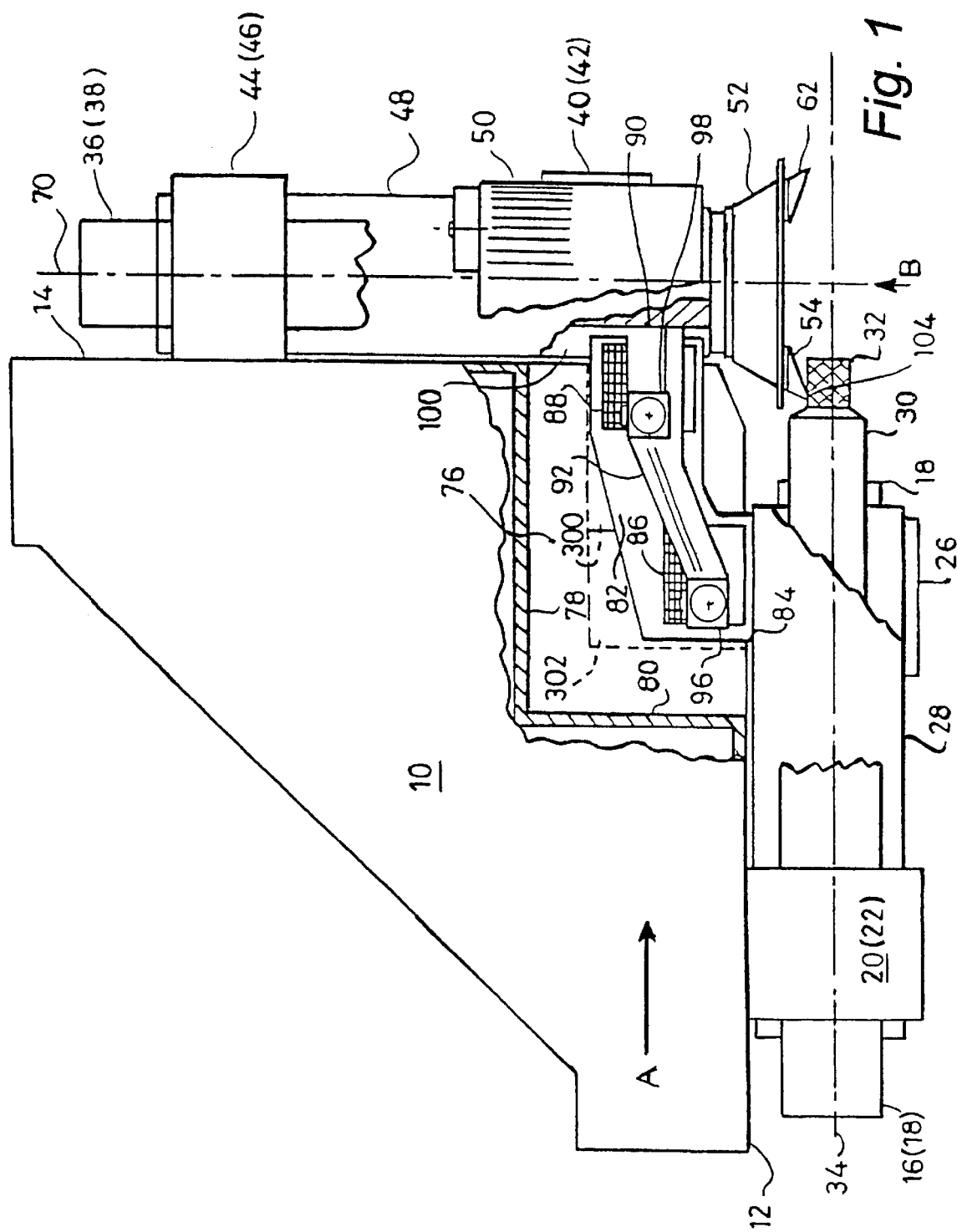
FIG. 1 is a plan view of part of a machine tool embodying the invention, with selected parts removed and with other parts cut away, for clarity.
Figure 2:
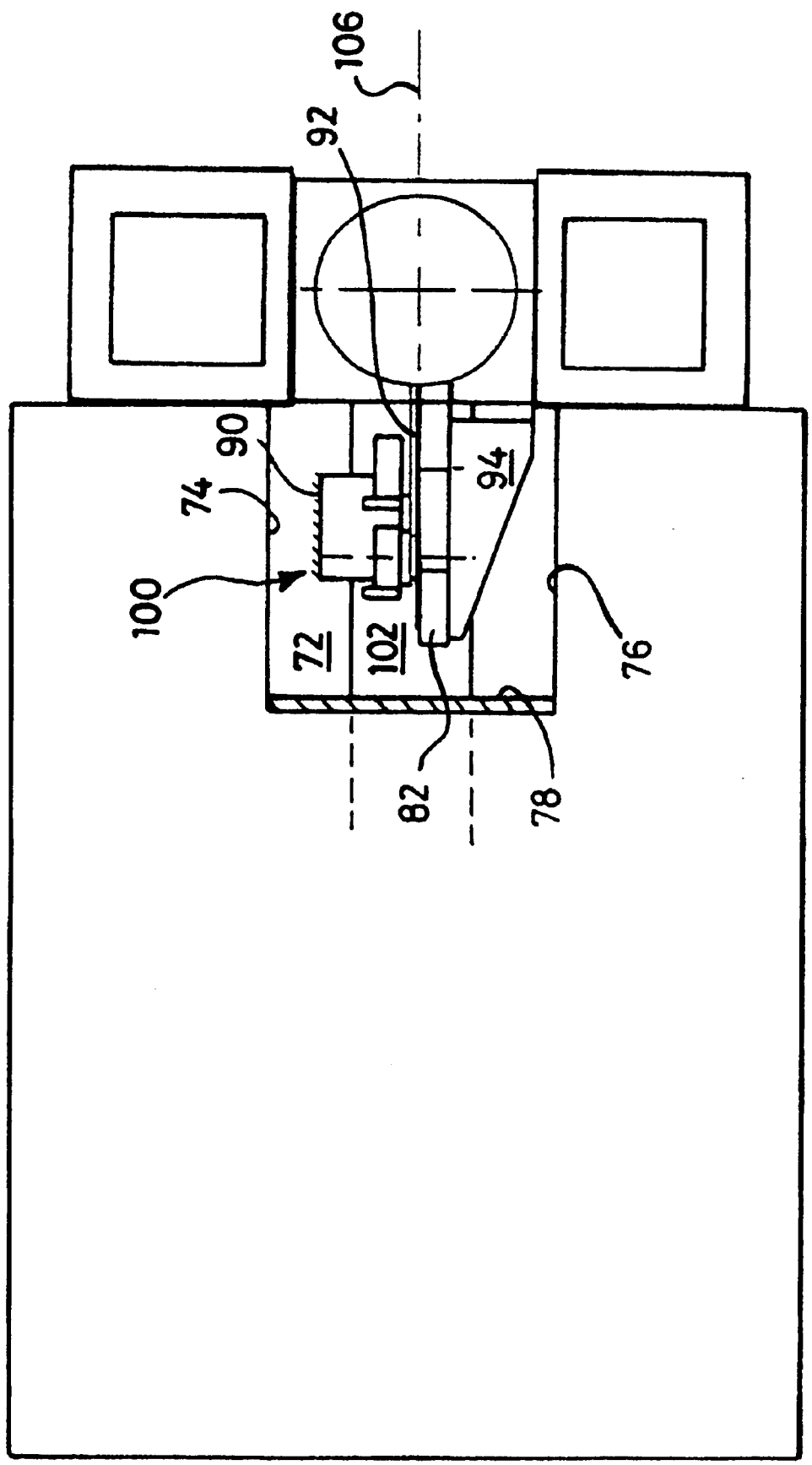
FIG. 2 is an end view of the machine in the direction of arrow A in FIG. 1, again with selected parts removed for clarity.
Figure 3:
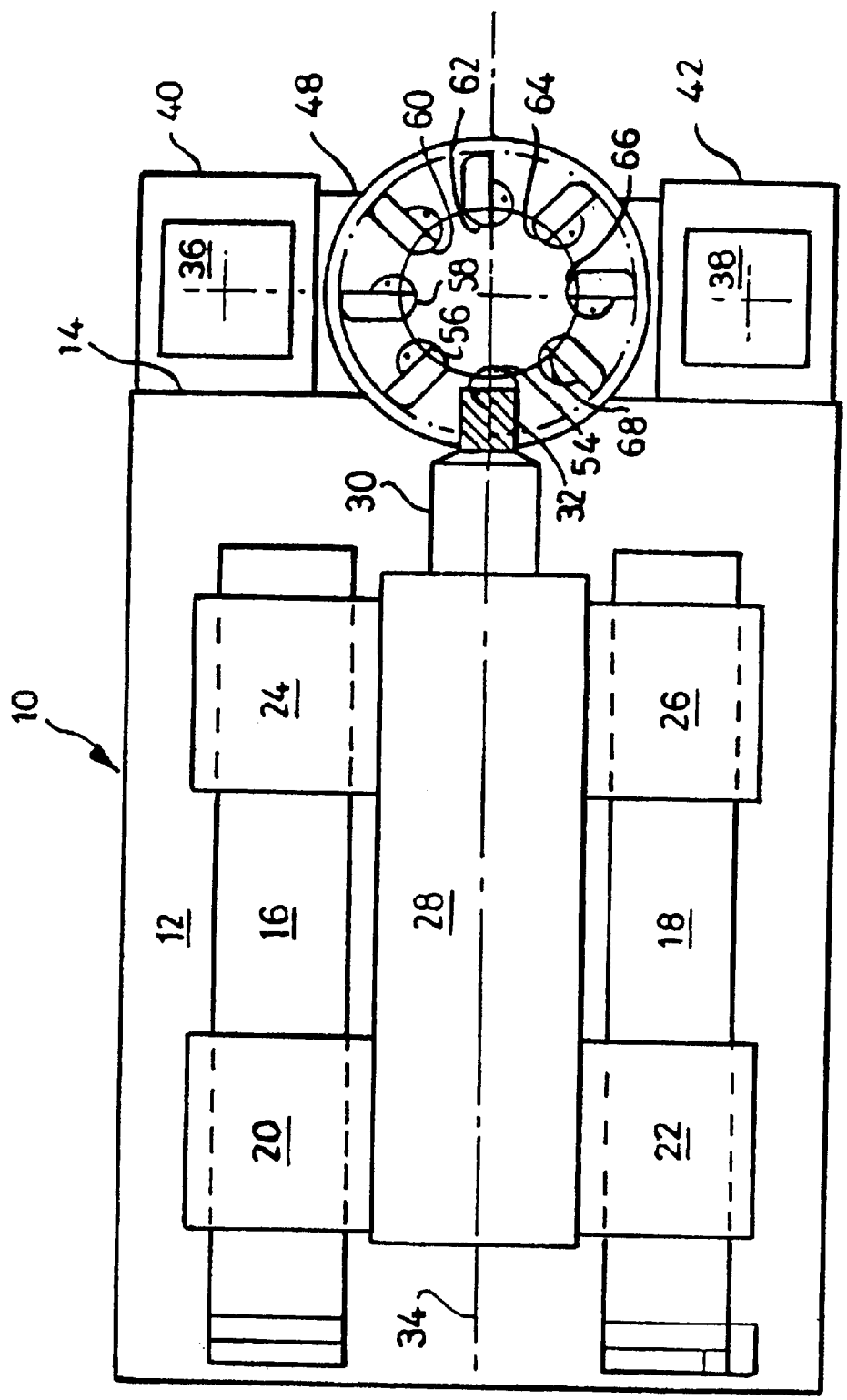
FIG. 3 is a front view of the machine in the direction of arrow B in FIG. 1, again with selected parts removed for clarity.

With reference to FIGS. 1 to 3, part of the main frame of a machine tool is denoted by 10. Typically this is a casting with flat orthogonal faces machined thereon at 12 and 14 to which are attached upper and lower slideways, best seen in FIGS. 2 and 3 for carrying tool and workpiece supports (carriages). Thus as face 12 is shown in FIG. 3, are mounted two parallel rails 16, 18 on which two pairs of upper and lower slides 20, 22 and 24, 26 respectively are mounted for sliding movement therealong. A workpiece support 28 is carried by the slides and a chuck 30 protrudes from one end thereof in which is secured a workpiece (such as a spindle 32).

Rotational drive for driving the chuck and therefore the workpiece about the workpiece axis 34 is provided within the support 28 and indexing drive means for incrementally advancing or retracting the support 28 in a direction parallel to the axis 34 is also provided (but not shown). The indexing drive (not shown) is selected to permit high accuracy positioning of the support 28 relative to the casting rails 16, 18.

Two similar rails 36, 38 are mounted on the adjoining orthogonal casting face 14 and these provide slideways for two further pairs of slides 40, 42 and 44, 46 (see FIG. 1) which carry between them a tool support (carriage) 48. Mounted on the latter (and visible in FIG. 1) is an indexing drive 50 by which a tool capstan (or turret) 52 bearing eight tools 54 to 68, can be rotatably indexed as required to bring any one of the eight tools into a workpiece engaging position, as is tool 54 in FIG. 3. Only tools 54 and 62 are shown in the plan view of FIG. 1, which shows more clearly than does FIG. 3, the machining engagement of the tool 54 with the workpiece 32.

Further drive means (not shown) is mounted on the casting 10 or the support 48, for incrementally indexing the support 48 along the tool axis 70, towards and away from the workpiece 32.

Also mounted between each support carriage 28, 48 and its respective mounting face 12, 14 is linear position determining means (200, 202 in FIGS. 4 and 6) for indicating the position of each carriage 28, 48 relative to its axis 34, 70 respectively and, if moved therealong, the displacement of either support carriage 28, 48 relative thereto. The outputs of the position determining means can also be used to calculate the carriage velocities relative to the casting 10.

The corner of the casting 10, defined by the two mounting faces 12, 14 is cut-away to form a cavity 72 defined by horizontal faces 74, 76 and vertical walls 78, 80. Wall 78 is visible (in section) in FIG. 2, together with the upper and lower horizontal faces 74, 76 whilst in FIG. 1 both walls 78 and 80 are shown (in section) together with the lower horizontal face 76—the upper region of the casting (including the upper face 74) having been cut-away.

The cavity provides the space into which the position indicating means of the invention can protrude.

In accordance with the invention, a horizontal platform 82 is secured to the workpiece support carriage 28 at 84 and carries two separate two-axis scales (gratings) 86 and 88 whilst secured at 90 to the tool support carriage 48 is a rigid arm 92 which is positioned so as to extend laterally from the support 48 to overlie the platform 82 and be parallel thereto. Although not illustrated, vertical ribs may be formed on the upper face of the arm 92 to improve its rigidity. Its underside is substantially flat.

In a similar way the underside of the platform 82 is provided with strengthening ribs one of which is shown at 94 in FIG. 2.

Carried by the arm 92 are two reading heads 96, 98 which are positioned thereon so as to overlie and cooperate with the scales 86, 88 respectively, to provide X and Z axis coordinates. Since the scales move with the workpiece support carriage 28 and the reading heads move with the tool support carriage 48, the difference between $X_1$, $Z_1$ and $X_2$, $Z_2$ (the X and Z coordinates at the beginning and ending of the linear movement of one of the two carriages 28, 48 relative to the casting 10) will in fact be the movement of the one carriage relative to the other. Thus, for example, if the workpiece support carriage is stationary (i.e. is fixed in position along the Z axis 34), then if the tool support carriage 48 advances by 2 microns along the axis 70 (the X axis), the value of $Z_1$ and $Z_2$ would be the same, and the value of $X_2$ will be 2 microns greater than the value of $X_1$.

If however the reaction at the engagement of the tool and workpiece to the application of a driving force to the support carriage 48 to advance the tool 54 by 2 microns causes a tiny distortion of the structure mounting the support carriage 48 and/or in the casting 10 and/or in the structures mounting the support carriage 28, the result may be that the actual movement of the tool 54 relative to the workpiece 32 will be greater than 2 microns in order to achieve a 2 micron change in the X axis coordinates from the primary reading head 98. This will result in an excess of material being removed from the diameter of the workpiece.

For some applications, the errors caused by such distortions can be disregarded, and for such applications the machining increments may be determined simply by monitoring the X axis coordinates from the reading head 98 after calibrating the start position of the carriage 48 (i.e. its position when the tool 54 just touches the workpiece for the first time as the carriage 48 is advanced).

Where such errors are unacceptable, the X axis readings from the second reading head 96 may also be taken into account and if the coordinate value for 96 begins to get out of step with that from 98, an error signal is computed in a computing device which is indicative of the magnitude of the distortion occurring along the X axis due to the reaction to the machining forces at the tool/workpiece point of engagement.

By utilising a trigonometric analysis of this error signal, the drive to the tool support carriage 48 may be adjusted and released or removed sooner than would have otherwise been the case, to prevent extra unwanted advancement of the tool along its axis 70.

In order to accommodate the platform 82 the inboard face of the support carriage 48 is recessed at 100 (see FIGS. 1 and 2) and the region of attachment 90 between the arm 92 and the carriage 48 is in fact on the internal face 102 of the recess 100.

Different tools such as 56, 58 etc can be brought into use by restricting the carriage 48 to remove the tool assembly from the region of the workpiece and indexing the capstan until the desired tool is in the "working" position, after which the carriage can be advanced once again so that the new tool engages the workpiece.

The invention is of particular application to machining operations and workpieces requiring very short axial movement (stroke) of tool relative to workpiece and workpiece relative to tool. Machining tiny parts such as spindles for computer disc drives, in one such application, where high machining accuracy is required to achieve accurate finished diameters and minimal high and low points.

Where high accuracy is required, drives for achieving X and Z axis displacement of the carriages 28 and 48 may be High Traction Friction Drives such as have been developed and supplied by Cranfield Precision Engineering Ltd of Wharley End, Cranfield, Bedford, England. Such drives allow incremental steps of less than 0.1 micron to be achieved.

In a typical application the tool carriage X basic stroke may be of the order of 20 mm and the workpiece Z axis stroke some 50 mm.

Referring again to FIG. 1, the full advantage of the second reading head 96 is obtained if the distance between the reading head 98 and the point of engagement of the tool and workpiece (104 in FIG. 1) is the same as the distance between the reading head 98 and the reading head 96.

Parallax errors can arise if the point of engagement of tool and workpiece is not in the same plane as the scales and reading heads.

Since the scales and reading heads have finite depth, and a small gap must exist between the head(s) and the surface of the scale(s), it is not possible for the scales and head to occupy the same horizontal plane. However the configuration shown in the drawings minimises parallax errors which might otherwise arise by positioning the support platform 82 for the scale(s) just below the horizontal plane 106 which contains the workpiece axis and the point of tool of engagement 104 (see FIG. 1), and positioning the arm 92 which carries the reading heads by the same distance above that horizontal plane as the platform 82 is below. In this way the horizontal plane 106 lies in the gap between the reading heads and the scales.

Two-axis X, Z coordinate measuring devices are manufactured inter alia by Heidenhain, Dr. Johannes Heidenhain GmbH, which utilise diffraction gratings and optical sensors for accurately determining movement in two orthogonal directions.

Figure 4:
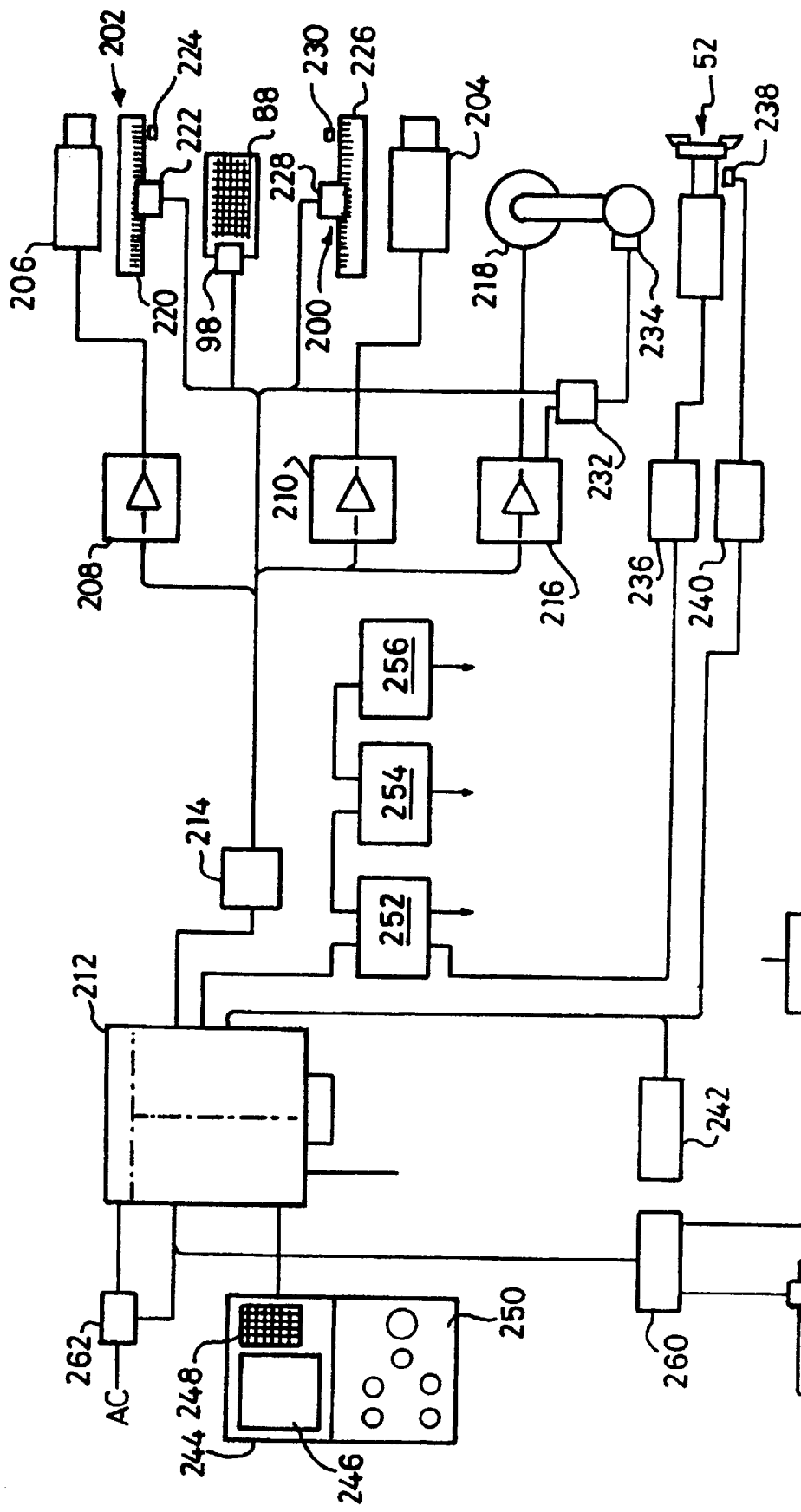
FIG. 4 is a block diagram of a control system for the machine tool.
Figure 5:
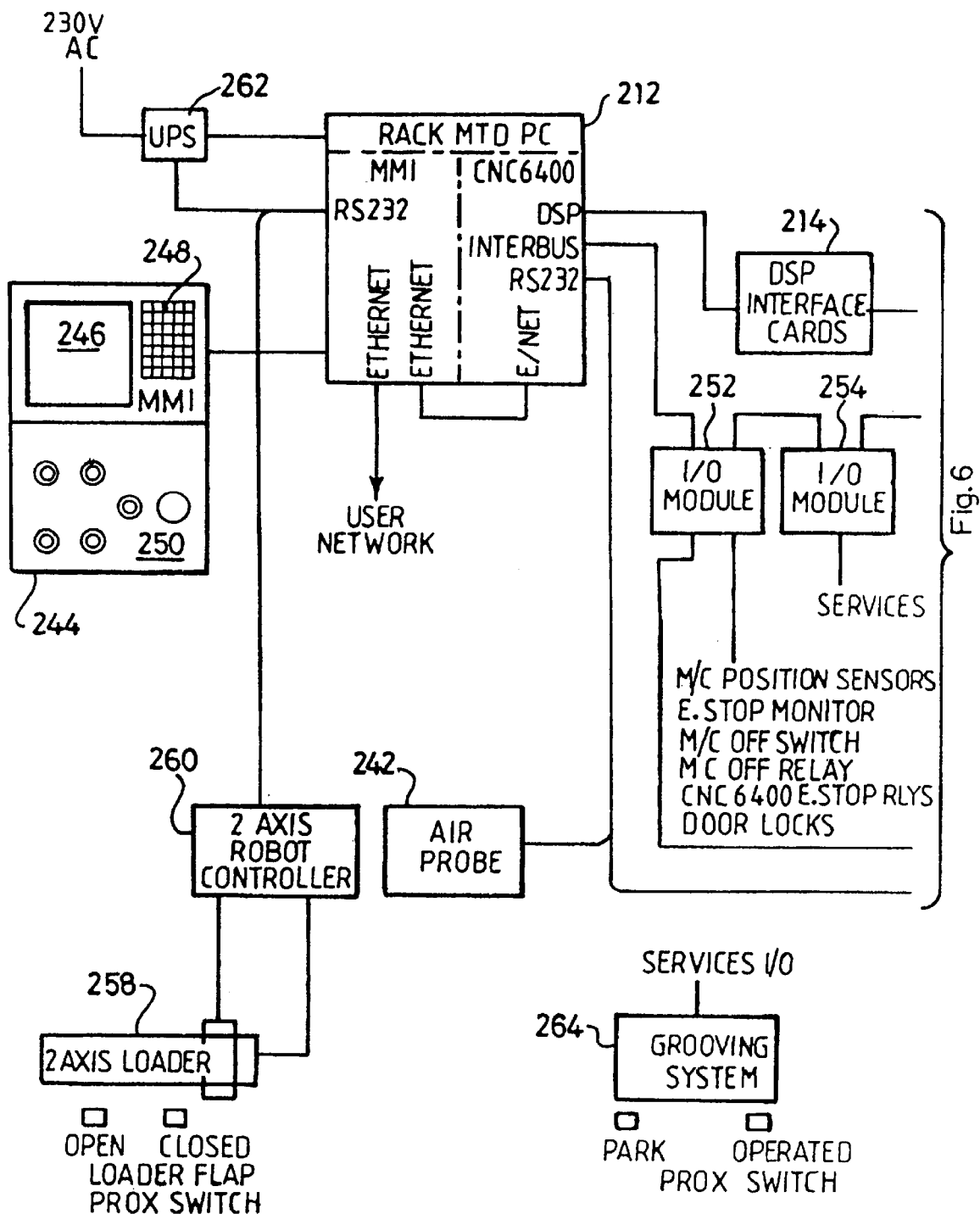
FIGS. 5 and 6 are block diagrams each showing a respective part of the system of FIG. 4 to an enlarged scale.
Figure 6:
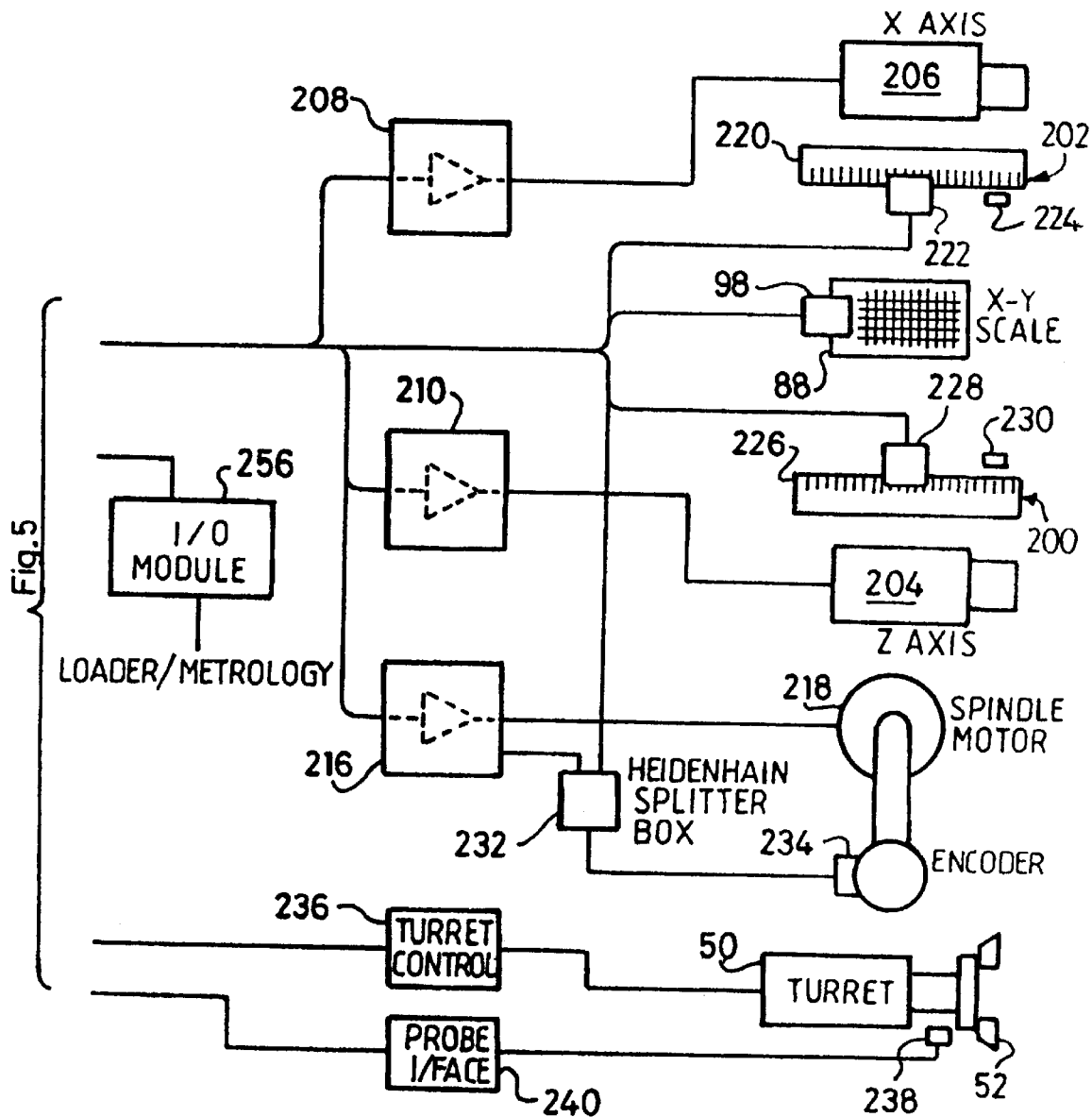

With reference to FIGS. 4 to 6, the carriages 28 and 48 are respectively driven by "voice coil" type motors 204 and 206. Power for operating the motors 204 and 206 is provided by amplifiers 208 and 210 under the control of a (rack MTD PC) computer 212 connected to the motors 208 and 210 via digital signal processing interface cards 214 which allow the computer to send control signals to the motors 208 and 210. The cards 214 also allow the computer 212 to control a spindle amplifier 216 which, in turn, supplies the power for operating a spindle motor 218 for rotating the chuck 30.

The position determining means 202 comprises a linear scale 220 mounted on the carriage 48, and a Heidenhain encoder 222 which is mounted on the casting 10 and is arranged to read the scale 220. Further information on the position of the carriage 48 relative to the casting 10 is provided by a datum switch 224 which is mounted on the casting 10 and is closed by a portion of the carriage 48 (not shown) when the latter is at one end of its range of movement along the axis 70. The determining means 200 similarly comprises a linear scale 226 on the carriage 28, and a sensor 228 and datum switch 230 mounted on the casting 10.

The outputs from the sensors 98, 222 and 228 are fed to the computer 212 via a Heidenhain splitter box 232, as is the output from an encoder 234 mounted on the workpiece spindle (on which the chuck 30 is also mounted) of the machine and arranged to provide velocity and position information on the spindle, and hence the workpiece 32. The splitter box 232 also enables those sensors to communicate with the amplifiers 208, 210 and 216.

The computer 212 is also connected to the indexing drive 50 for the capstan 52 through control circuitry 236, and information on the angular position of the capstan 52 is derived by the computer from the output from Kaman probes 238 connected to the computer 212 through an interface unit 240. The dimensions of parts of the workpiece mounted on the machine can be measured by means of air probes 242 which are also connected to the computer 212.

An operator can control the operation of the computer 212 by means of a Man Machine Interface 244, which in this case takes the form of a monitor 246, keypad 248 and control panel 250. The machine can also produce various control and information signals and receive various other signals, for example loader or metrology signals through I/O interface modules 252, 254 and 256 connected to the computer 212. The present example of machine includes a 2-axis loader robot 258 which is connected to and controlled by the computer 212 using control circuitry 260.

In the event of an interruption in the mains power supply to the machine, the power supply to the computer 212 is maintained by an uninterruptable power supply 262, which permits controlled stops of the machine and prevent data being lost from the volatile memory of the computer 212.

The machine may also be equipped with a grooving tool (not shown) which can be advanced to the workpiece by means of a grooving system generally indicated at 264.

The encoder 96 is also connected to the computer 212 through the splitter box 232, but has been omitted from FIGS. 4 to 6 for the sake of simplicity.

Each of the carriages 28 and 48 may carry a respective plate which is used to provide damping for the carriage movement. The plates may be disposed just above the bottom wall 76 and below the strengthening rib 94 at positions generally indicated at 300 and 302, each of which respectively refers to the plate attached to the carriage 48 and the carriage 28. For the sake of clarity, the plates are not shown in the drawings. The plate attached to the carriage 28 overlies that attached to the carriage 48, and a viscose fluid, such as oil, is introduced between the two plates to provide damping of the carriage movements. In an alternative arrangement, the two plates do not overlie each other, but each plate instead partially overlies a respective tray mounted on the bottom of nut 76, the trays containing the viscose fluid for providing said damping. In such a case, each tray may be movable to vary the proportion of the respective plate which overlies it so as to enable the amount of damping of the respective carriage to be fine tuned.

Two examples of the operation of the grinding machine will now be described with reference to the following definitions of the various offset and reference values which are used to determine the correct path for a working tool on the capstan 52 relative to a workpiece mounted on the carriage 28:

X and Z Axes' Reference Points

These are the positions along the X and Z axes respectively of the carriages 48 and 28 which is defined by a given reference point. Initially, the reference point can be defined by the positions of the carriages at which the datum switches 224 and 230 are closed. The reference line(s) on either of the grids 86 and 88 corresponding to those positions can then be stored by the machine to enable it to find the reference positions in subsequent operations.

X and Z Axes' Home Positions

These are the positions which are considered to be the retracted ends of the strokes of the carriages 28 and 48. At these positions, the displays on the Man Machine Interface 244 are set to indicate a value of +35 for X and +50 for Z.

X Axis Cutting Point

This is the position of the carriage 48 at which a tool (which requires no offsets) will be positioned on the axis 34, and therefore corresponds to the farthest forward end of the stroke of the carriage 48, i.e. when X=0.

Z Axis Cutting Point

A tool (requiring no offsets) on the capstan 52 would be placed 10 mm beyond (into) the front face of the jaws of the chuck 30 at this point, which is where the carriage 28 is at the farthest forward end of its working stroke (at which Z=0).

Chuck Z Reference Offset

This is the difference in Z values (a distance along the axis 34) between the front face of the jaws of the chuck 30 actually fitted to the machine and that of 15 mm notional chuck jaws. This offset can be varied to compensate, for example, for skimming of the jaws.

Toolset X and Z Offsets

These are the measured differences between the ideal position of a cutting edge of a tool in the capstan 52 and its actual position when fitted to the machine. If the offsets are zero, the tool edge is placed on the cutting points when X and Z=0. These offsets are measured on an offline tool referencing fixture and fed to the computer 212. Each tool requires its own X and Z offset values.

Index X and Z Tool Offset

This is the detected difference between the position at which a tool on the capstan 52 is actually placed at the cutting point, and the corresponding position for previous operations of the machine. These offsets represent the non-repeatability of the movement of the tool and workpieces relative to each other. For a given capstan 52, there will be eight pairs of X and Z tool offset values, one set for each position on the capstan.

X and Z Metrology Tool Offset

After a workpiece has been operated on by the machine, it is transferred to a post-process metrology station (not shown) where the workpiece dimensions are measured and compared with theoretical dimensions. The metrology station therefore produces a set of constantly updated values which represent the offset necessary to keep the dimensions of the finished workpiece within a predetermined tolerance as conditions change with time. Errors arising from gentle thermal drifts, tool wear etc will be corrected in this manner. These corrections can be automatically input into the computer through the module 256 or manually input should offline metrology features not measured at the metrology station indicate a drift out of working limits.

During the construction and setting up of the machine, the stroke of each of the carriages 28 and 48 can be adjusted, within soft limits, by changing the amount of movement required to take the carriages from the reference point positions and home positions to the cutting points. This will be reflected by changes in the differences between the X values corresponding to the reference/home positions and cutting positions.

The computer 212 can then be programmed to define the start and finish points of the path of movement of the tool with respect to the X and Z axes cutting points, i.e. with respect to the axis 34 and the face of the jaws of the chuck 30. The machine automatically makes further corrections by monitoring the finished workpiece and also by checking for non-repeatability of the capstan 52.

EXAMPLE 1

Turning a Diameter

To form a cylindrical workpiece of 10 mm diameter, the following steps are taken:

1. The carriages 28 and 48 are moved into their respective home positions;
2. the toolset X offset of a tool is measured by placing the tool in a tool holder of an off-machine tool referencing device (not shown). The tool (for example 54) is then mounted in a given receptacle in the face-plate of the capstan 52 and the measured toolset X offset is entered into the computer 212 which places that figure in a tool offset data-table applicable to that receptacle;
3. the tool is then advanced on the carriage 48 to a position of X=5.000 (i.e. at which the end of the tool is 5 mm away from the axis 34), and the tool is then in a position to turn the 10 mm diameter, since the computer 212 will have incorporated the toolset X offset into the position coordinates of the tool;
4. during the initial turning, the index X tool offset is set to zero;
5. after the 10 mm turned diameter workpiece is produced, it is transferred to the metrology station.

The accuracy of the finished component will be limited by the accumulated errors in the position of the X axis cutting point, the determined toolset X offset value, and errors introduced from non-repeatability of the positions of the receptacle in the capstan 52, both in relation to the face-plate of the capstan and the reference points of the carriages 28 and 48.

However, the metrology X tool offset is calculated at the metrology station and fed back into the computer 212, which will then use the metrology X tool offset value to revise the tool position for subsequent workpieces.

Before such workpieces are formed, the machine will also calculate a value of the index X tool offset by moving the carriage 70 until the sensors 96 and 98, operating in cooperation with the scales 86 and 88, indicate that the tool is at the X axis cutting point, and then comparing that measurement with the position measurement given by the determining means 202. This data is then used to revise the tool position, again to correct for non-repeatability of the tool index.

Should all other functions on the machine remain unchanged, and the calculated value of the offsets be correct, the second part, in theory, will be turned exactly to size.

Subsequent parts can be produced in the same manner, the metrology X tool offset in these cases being subjected to a smoothing algorithm to stabilise the correction process.

EXAMPLE 2

Turning a Face

To turn a face with a positional dimension relative to a pre-machined feature, the feature's position relative to the front of the jaws of the chuck 30 needs firstly to be established. In the following example, this dimension is 3 mm.

1. The carriages 28 and 48 are first moved to their home positions as before.
2. The tool is then placed in an off-machine tool referencing fixture, so that the toolset Z offset can be measured. The tool and its holder are then mounted in a given receptacle in the capstan 52, and the toolset Z offset figure entered into the computer which uses the figure in an offset data table for that receptacle.
3. The carriage 28 is then moved until a position of Z=13.000 is reached, and as a result the tool is then in a position to turn the face as the controller will have incorporated the toolset X offset into the actual Z position of the tool relative to the workpiece. If there is currently a valid chuck Z reference offset in the memory of the computer 212, the latter will also use this figure to modify the Z position of the tool when at the cutting face.
4. The index Z tool offset figure is set to zero during the turning of the first face.
5. The part produced by the process is then transferred to the metrology station and can also be subsequently manually measured.

The accuracy with which the part is formed will be limited by the accumulated errors in the position of the Z axis cutting point, the toolset Z offset value and the calculated chuck Z reference of said offset, and the errors introduced from the non-repeatability in the locations of the tool holder receptacles (and the capstan 52).

If it is found that, for subsequent parts, the position of the cut face has to be moved, the chuck Z reference offset or the metrology Z tool offset can be manually adjusted by inputting suitable commands into the computer 212.

To turn a second part, the machine will automatically use new offsets to revise the tool position. The machine will also take the value currently found in the index Z tool offset (which is calculated in a similar fashion to the index X tool offset) and will revise the tool position again to correct for non-repeatability of the tool index for subsequent parts.

Should all other functions on the machine remain unchanged, and the value of the offsets be correctly calculated, the second and subsequent parts will theoretically be turned exactly to size.

What is claimed is:

1. A method of determining the linear movement of a first carriage relative to a second carriage in a machine tool, wherein each carriage carries a respective one of a workpiece and a tool for machining the workpiece, and wherein two-axis scale means is attached to one carriage so as to move therewith, and a reading head which cooperates with the scale means is attached to the other carriage to move therewith, the method comprising the steps of: deriving positional data from the reading head and scale means for the first carriage, exerting a force on at least one of the two carriages to effect a movement thereof relative to the machine, and deriving a value for the linear displacement of the first carriage relative to the second by determining the difference between the positional data at the beginning and that at the end of the carriage movement, wherein a second reading head is attached to one of the two carriages at a position thereon separate from the position of attachment of the first reading head measured parallel to the axis of movement of the other carriage, the second reading head cooperating with said two-axis scale means attached to the other carriage, the method further comprising the steps of deriving second positional data relating to the first carriage from the second reading head, and computing an error value from any difference between the displacement values derived from the positional data from the two separate reading heads, and correcting the linear displacement value obtained from the first reading heads by using the said computed error value.

2. A method according to claim 1, in which both reading heads are attached to the same carriage, both heads cooperating with a single two-axis scale means attached to the other carriage.

3. A method according to claim 1, in which the first carriage is moved in incremental steps and the position value at the end of each step adjusted, so accurate positioning of a carriage can be achieved.

4. A method according to claim 1, in which the method includes the step of adjusting the position of the workpiece or tool carriage, or both, to compensate for any difference in the positional data obtained from the reading heads consequent on any unwanted movement of one carriage relative to the machine and/or the other.

5. A method according to claim 4, in which the difference is monitored and compensated for by adjusting the drive to the workpiece carriage, or tool carriage, or both, so as to reposition one or the other or both to the position it or they should have adopted had the movement been undistorted, so as to compensate for any distortion and maintain the point of engagement of the tool and the workpiece independent of distortion between the workpiece and tool carriage axes.

6. A method according to claim 1, in which viscous damping is applied to the carriage movements.

7. A machine comprising a movable workpiece carriage for carrying a workpiece to be machined and a movable tool carriage for carrying a tool for removing material from the workpiece, a two-axis scale means mounted on one of the carriages so as to move therewith, a reading head adapted to cooperate with the scale means attached to the other said carriage, and signal processing means for receiving signals from the reading head indicative of the position and/or movement of one carriage relative to the other, and generating positional data about one or both of the carriages to assist in controlling the movement of one or both carriages to effect a machining operation, and in which the machine tool includes a further reading head also adapted to cooperate with the scale means, and mounted on the same carriage as the reading head but at a different position from that at which the head is mounted, and in which the signal processing means is receptive of signals from both heads and provides a first output signal indicative of the linear movement of one carriage relative to the other, and a second output signal indicative of any difference between the positional signals derived from the two heads.

8. A machine tool according to claim 7, in which the reading head is attached to the underside of the tool carriage close to the machining point and the scale is mounted in a similar manner to the workpiece carriage.

9. A machine tool according to claim 7, in which the scale means comprises two two-axis scales, one for each respective head, arranged in substantially the same plane.

10. A machine tool according to claim 9, in which the two scales are attached to one carriage, and are arranged as close as possible to the point of engagement between the tool and the workpiece, and in which the two reading heads for cooperating with the two scales are carried by the other of the two carriages.

11. A machine tool according to claim 7, in which the machine tool includes feedback means for adjusting the position of a workpiece or tool carriage to take account of any error signal obtained from signal processing means receptive of positional data from the two reading heads.

12. A machine tool according to claim 7, in which the machine tool includes viscous damping means comprising a first plate fitted to the tool carriage and a second plate fitted to the workpiece carriage, the two plates being in close proximity to the scale system, and means for applying viscous damping to the two plates.

13. A machine tool according to claim 12, in which said means for applying viscous damping to each plate comprises a respective separate viscous damping medium, each of which is adjustable for fine tuning.

14. A machine tool according to claim 12, in which the application of damping to the two plates is achieved by means of a single viscous damping medium into which the plates protrude.

15. A machine tool according to claim 14, in which one of the plates overlies the other and a viscous fluid is introduced between the two plates to provide the said damping.

16. A machine tool according to claim 7, in which the carriages move along axes defined by respective guideways mounted on orthogonal vertical faces of a machine structure so as to reduce the distance between the two guideways.

17. A machine tool according to claim 9, in which one two-axis scale is mounted in close proximity to the workpiece carriage and the other two-axis scale is also mounted to the workpiece carriage but spaced therefrom by a distance similar to that between the first mentioned scale and the workpiece, measured along the workpiece axis.

18. A machine tool according to claim 17, in which the first scale preferably extends horizontally substantially in alignment with the tool and tool mounting whilst the second mentioned scale extends horizontally substantially in alignment with the workpiece and its support, so that parallax errors as between tool and first scale and between the workpiece and the second scale can be reduced.

19. A method of reducing or eliminating machine induced errors which affect the orthogonality of the axes of a first and a second carriage of a machine tool the carriages being moveable substantially orthogonally with respect to one another, each carriage carrying a respective one of a workpiece and tool for machining the workpiece, comprising the steps of attaching a two-axis scale means to one carriage so as to move therewith, attaching a reading head which cooperates with the scale means to the other carriage to move therewith, the reading head being disposed in substantially the same plane as the two-axis scale means, deriving positional data from the reading head and scale means for the first carriage, exerting a force on at least one of the two carriages to effect a movement thereof relative to the machine, and deriving a value for the linear displacement of the first carriage relative to the second by determining the difference between the positional data at the beginning, and at the end, of the carriage movement.

20. A machine tool comprising a moveable workpiece carriage for carrying a workpiece to be machined by rotation about its axis and a tool carriage for carrying tool for removing material from the workpiece, the two carriages being moveable in orthogonal directions, two-axis scale means mounted on one of the carriages so as to move therewith, reading head means adapted to cooperate with the scale means attached to the other carriage, and signal processing means for receiving signals from the reading head means indicative of the position and/or movement of one carriage relative to the other, and for generating positional data about one or both of the carriages to assist in controlling the movement of one or both carriages to effect a machining operation, the reading head means being disposed in substantially the same plane as the scale means but spaced apart a minimal distance on opposite sides respectively of the workpiece axis such that parallax errors as minimised.

21. A machine tool according to claim 20, in which the reading head means comprises a first reading head, and a second reading head also adapted to cooperate with the scale means and mounted on the same carriages as the first reading head but at a different position from that at which the first reading head is mounted, and in which said signal processing means is receptive of signals from both said reading heads and provides a first output signal indicative of the linear movement of one carriage relative to the other, and a second output signal indicative of any difference between the positional signals derived from said reading, heads.

22. A method of machining so as to remove material from a rotating workpiece using a tool which may be static or rotating, the method comprising the steps of moving the tool so as to engage the surface of the workpiece to remove material therefrom, determining the position of the tool carriage using a two-axis scale measuring system comprising a reading head mounted to one of the workpiece carriage or tool carriage and two-axis scale means mounted to the other, positioned close to the working region, and controlling the advance of the tool, and therefore the extent of the machining, using positional data from the reading head, and further including the steps of determining the tool carriage position by means of a second reading head also cooperating with said two-axis scale means, and mounted to the same carriage as the first mentioned reading head, and measuring any distortion and utilizing any measured divergence between scale readings and predicted scale readings following any given linear carriage movement of to enable a correction to be made in the linear carriage movement and thereby compensate for any distortion due to machining forces.

23. In a machining process in which a tool is progressively moved by means of discrete movement instructions relative to a rotating workpiece so as to remove material from a rotating, surface thereof, first tool position defining signals are obtained from a first reading head which is attached to and movable with the tool support and which cooperates with two-axes scale means attached to the workpiece support for movement parallel to the axis of rotation of the workpiece as the workpiece support is moved; and second tool position defining signals are obtained from a second reading head also attached to and movable with the tool support and cooperating with the two-axis scale means; and error signals indicative of any positional error of the tool are obtained by determining the values of the signals which should be obtained from the second reading head for a given linear movement of the tool from the first position to a second position using tool position defining signals obtained from the first reading head, and making a comparison therewith of the actual second tool position defining signals obtained from the second reading head.

24. A method according to claim 23, in which the position of one support or the other (or both) may be adjusted in response to any error signal derived from the said comparison, to achieve a desired position of the tool relative to the workpiece, or the next movement instruction so the tool support may be modified to take account of the actual position of the tool as a result of the previous movement instructions.

\* \* \* \* \*